(12) United States Patent
Berrak et al.

(10) Patent No.: US 7,828,953 B2
(45) Date of Patent: Nov. 9, 2010

(54) PROCESS AND APPARATUS FOR TREATING SLUDGE BY THE COMBINED ACTION OF ELECTRO-OSMOSIS AND PRESSURE

(75) Inventors: Abderrazak Berrak, Sherbrooke (CA); Abderrahmane Dermoune, Sherbrooke (CA)

(73) Assignee: GL & V Canada Inc., Montreal, Quebec (CA)

( * ) Notice: Subject to any disclaimer, the term of this patent is extended or adjusted under 35 U.S.C. 154(b) by 1344 days.

(21) Appl. No.: 10/902,877

(22) Filed: Aug. 2, 2004

(65) Prior Publication Data
US 2005/0016870 A1 Jan. 27, 2005

Related U.S. Application Data

(63) Continuation-in-part of application No. PCT/CA03/00201, filed on Feb. 11, 2003.

(30) Foreign Application Priority Data

Feb. 12, 2002 (CA) .................................. 2371396
Sep. 4, 2002 (CA) .................................. 2404486

(51) Int. Cl.
*C25C 7/00* (2006.01)
(52) U.S. Cl. .................. 205/687; 204/242; 204/194
(58) Field of Classification Search .......... 204/242; 205/687
See application file for complete search history.

(56) References Cited

U.S. PATENT DOCUMENTS 4,100,068 A * 7/1978 Jordan et al. ............. 209/127.1
4,244,804 A  1/1981 Moeglich et al.
4,376,022 A  3/1983 Porta et al.

(Continued)

FOREIGN PATENT DOCUMENTS

CA 1309970 11/1992

(Continued)

OTHER PUBLICATIONS

Gingerich et al., Electroosmotically enhanced sludge pressure filtration, May/Jun. 1999, Water Environmental Research, vol. 7, No. 3, p. 267-276.*

(Continued)

*Primary Examiner*—Mark F Huff
*Assistant Examiner*—Rashid Alam
(74) *Attorney, Agent, or Firm*—Anglehart et al.

(57) ABSTRACT

The present invention relates to a process for treating sludge by the combined action of electro-osmosis and pressure. This process comprises providing a cell for treating the sludge, the cell comprising at least two electrodes including at least one cathode and at least one anode. At least one of the electrodes is movable, and at least one of the electrodes is perforated so as to drain effluents. Then, the sludge is introduced into the cell between the at least two electrodes, each of the electrodes defining a surface adapted to constantly contact the sludge. Then, the sludge is submitted to an electric current by applying a voltage to the electrodes, and applying a pressure to the sludge by means of the at least one movable electrode so as to permit a constant contact between the surfaces and the sludge. An apparatus for carrying out such a process is also disclosed.

13 Claims, 6 Drawing Sheets

U.S. PATENT DOCUMENTS

| | | | |
|---|---|---|---|
| 4,861,496 A | 8/1989 | Diaz et al. | |
| 4,877,503 A * | 10/1989 | Candor | 204/542 |
| 5,019,230 A | 5/1991 | Candor | |
| 5,362,371 A | 11/1994 | Candor et al. | |
| 5,401,375 A | 3/1995 | Yamaguchi et al. | |
| 5,891,342 A | 4/1999 | Tije | |
| 5,922,209 A | 7/1999 | Yoshida et al. | |
| 6,217,741 B1 * | 4/2001 | Doi | 205/620 |
| 6,871,744 B2 | 3/2005 | Miller et al. | |
| 2002/0020631 A1 * | 2/2002 | Gavrel et al. | 205/752 |
| 2003/0150789 A1 | 8/2003 | Miller et al. | |
| 2005/0199499 A1 | 9/2005 | Berrak et al. | |

FOREIGN PATENT DOCUMENTS

| | | |
|---|---|---|
| CA | 2126549 | 6/1995 |
| CA | 2199389 | 4/1996 |
| CA | 2229642 | 2/1997 |
| CA | 2179476 | 12/1997 |
| CA | 2307724 | 5/1999 |
| CA | 2408971 | 11/2001 |
| CA | 2382357 | 1/2002 |
| CA | 2474727 | 8/2003 |
| CA | 2423213 | 9/2004 |
| CA | 2460627 | 9/2004 |
| CA | 2474176 | 11/2004 |
| EP | 0 480 835 | 4/1992 |
| EP | 0 534 861 | 3/1993 |
| JP | 60-114315 A | 6/1985 |
| JP | 60114315 | 6/1985 |

OTHER PUBLICATIONS

Gingerich et al. (Water Environment Research, May/Jun. 1999, vol. 71, No. 3, pp. 267-276).*
DE 12 47 982 B (The Motherwell Bridge and Engineering Company Limited) Aug. 24, 1967.
WO 98/50626 A (Kohl, Alois) Nov. 12, 1998.
DE 42 15 061 A1 (ASEA Brown Boveri AG, Baden, AARGAU CH) Feb. 4, 1993.
English Abstract of CN 1485282A, published on Mar. 3, 2004.
English Abstract of JP 56002817A, published on Jan. 13, 1981.
English Abstract of JP 63264200A, published on Nov. 1, 1988.
Gingerich et al., Electroosmotically Enhanced Sludge Pressure Filtration, *Water Environment Research*, vol. 71, No. 3, pp. 267-276, (May/Jun. 1999).

* cited by examiner

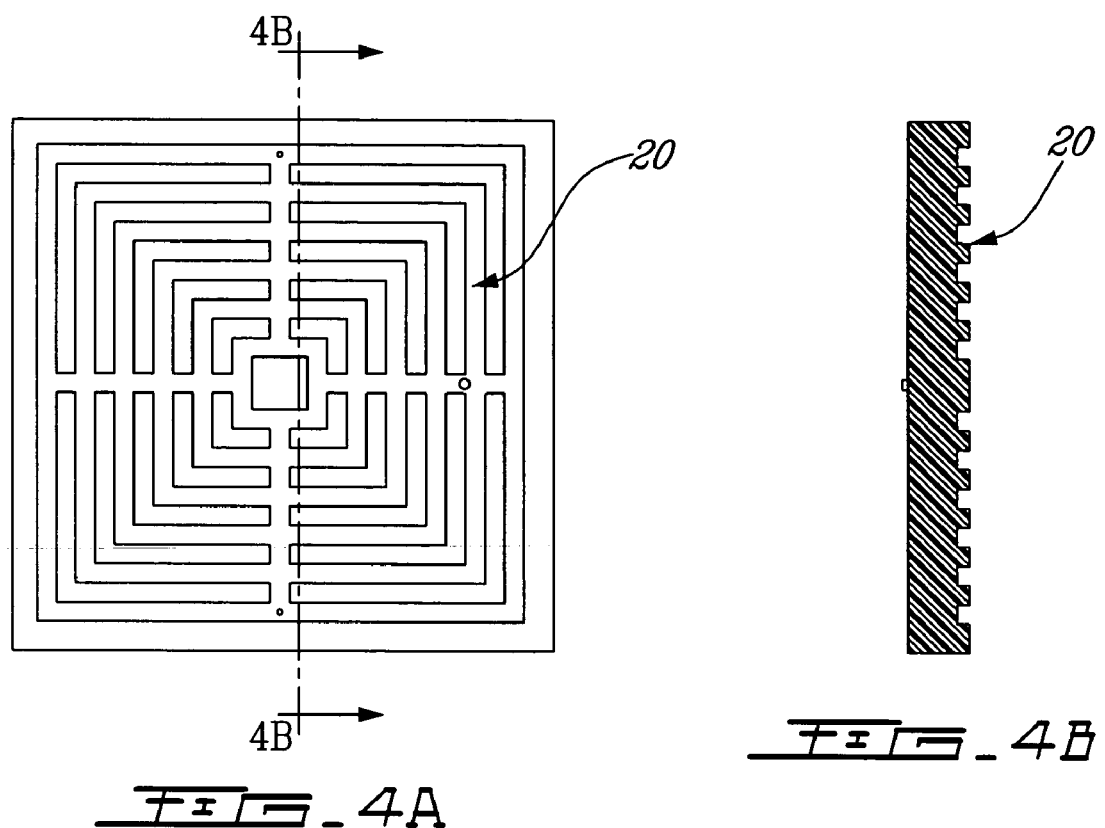
FIG_4A
FIG_4B
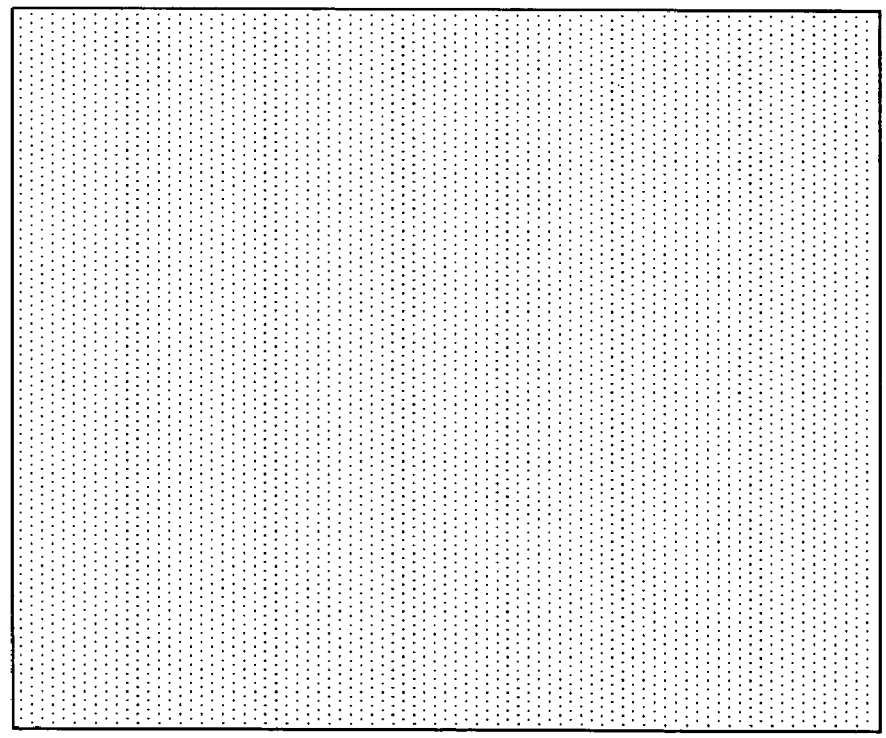
FIG_5

PROCESS AND APPARATUS FOR TREATING SLUDGE BY THE COMBINED ACTION OF ELECTRO-OSMOSIS AND PRESSURE

CROSS-REFERENCE TO RELATED APPLICATIONS

The present application is a continuation-in-part of PCT international application PCT/CA03/00201 filed on Feb. 11, 2003, which claims priority on Canadian patent application No. 2,371,396 filed on Feb. 12, 2002, and on Canadian patent application No. 2,404,486 filed on Sep. 4, 2002. All the above-mentioned applications are incorporated herein by reference in their entirety.

TECHNICAL FIELD

The present invention relates to improvements in the field of sludge treatment. In particular, the invention relates to a process and an apparatus for treating sludge by the combined action of electro-osmosis and pressure. Such a process and apparatus can be useful for treating various types of sludge.

BACKGROUND OF THE INVENTION

Electro-osmosis relates to the fact that an electrical potential having a direct current causes cations to move from the positive end (anode) toward the negative end (cathode), thereby dragging with it water molecules by a viscous action.

One of the main drawbacks of the electro-osmosis techniques is the drop of potential that occurs at the anode. A drop of potential at the anode can be explained by the decrease of water content of the soil (or sludge), disposed adjacently to the anode. It can also be explained by the decrease of the conductivity of the pore water, by the generated gases during the electrolysis, and by the dissolution of the material constituting the anode. Moreover, a drop of potential can also be explained because of an inappropriate contact between the anode and the soil or sludge. Thus, the voltage gradient which is directly applied to the soil or sludge can only be a fraction of the voltage applied to the electrodes.

The abstract of Japanese Patent No. 60,114,315 discloses a method of dehydrating an organic sludge. In this process, the organic sludge is impregnated with saline and dehydrated by using both compression and electro-osmosis. In particular, the sludge is charged into a cylinder comprising electrodes connected to compressing rods. Each of the electrodes comprises a filter cloth disposed between the sludge and the electrode. Moreover, in this process, the sludge is flocculated by adding flocculants.

U.S. Pat. No. 4,376,022 discloses an apparatus for concentrating an aqueous sludge by electro-osmosis. An electric field is applied to a sludge which is disposed between two electrodes. The sludge is thus treated by electro-osmosis and is continually circulating from top to bottom of the apparatus between the electrodes so as to expel water from the sludge. The electrodes comprise endless belts for moving the sludge, and filter bands disposed between the electrodes and the sludge.

Gingerich et al. in Water Environment Research, May/June 1999, pages 267-276, Volume 71, Number 3, describe a laboratory unit cell electro-osmosis device used for dewatering sludge. This device comprises a cylinder body including a piston and a bottom support plate, the latter acting as electrodes. The piston is activated by a compressed air inlet and a filter cloth is disposed on said bottom support plate, i.e. between the sludge and the bottom support plate. This document also describes various experimental series that have been made with this device, wherein different values of constant voltage or constant pressure have been tested.

SUMMARY OF THE INVENTION

It is therefore an object of the present invention to provide a process and an apparatus for treating sludge, which would overcome the drawbacks of the prior art.

It is also another object of the present invention to provide a process and an apparatus for treating sludge, which would maintain its efficacy during the whole treatment of the sludge.

It is also another object of the present invention to provide a process and an apparatus for treating sludge, which would reduce the drop of potential at the anode.

It is also another object of the present invention to provide a process and an apparatus for treating sludge, which would permit to optimize the proportion of the voltage gradient which is really applied to the sludge.

It is also another object of the present invention to provide a process and an apparatus for treating a sludge, which would permit to increase dryness of the sludge.

According to a first aspect of the invention, there is provided a process for treating sludge by the combined action of electro-osmosis and pressure. This process comprises:

a) providing a cell for treating the sludge, the cell comprising at least two electrodes including at least one cathode and at least one anode, wherein at least one of the electrodes is movable, and at least one of the electrodes is perforated so as to drain effluents;

b) introducing the sludge into the cell between the at least two electrodes, each of the electrodes defining a surface adapted to constantly contact the sludge; and c) submitting the sludge to an electric current by applying a voltage to the electrodes, and applying a pressure to the sludge by means of the at least one movable electrode so as to permit a constant contact between the surfaces and the sludge, thereby dehydrating the sludge and generating an acid effluent at the anode and a basic effluent at the cathode, the effluents being drained by means of perforations present in at least one of the electrodes.

According to a second aspect of the invention, there is provided a process for treating sludge by the combined action of electro-osmosis and pressure. This process comprises:

a) providing a cell for treating the sludge, the cell comprising at least two electrodes including at least one cathode and at least one anode, wherein at least one of the electrodes is movable, and at least one of the electrodes is perforated so as to drain effluents;

b) introducing the sludge into the cell between the at least two electrodes; and c) submitting the sludge to an electric current by applying a voltage to the electrodes, and applying a pressure to the sludge by means of the at least one movable electrode, thereby dehydrating the sludge and generating an acid effluent at the anode and a basic effluent at the cathode, the effluents being drained by means of perforations present in at least one of the electrodes, wherein the pressure applied to the sludge by the at least one movable electrode varies according to the sludge consistency, the pressure increasing when the sludge consistency is increasing, and wherein the voltage applied to the electrodes is maintained substantially constant during the process or during successive plateaus wherein the voltage is adjusted to a fixed value, thereby permitting an increase of a voltage gradient.

According to a third aspect of the invention, there is provided an apparatus for treating sludge comprising:
- a cell comprising at least one inlet for receiving the sludge, at least one outlet for exiting a gaseous portion, at least one outlet for exiting a liquid portion, and at least one outlet for exiting a solid portion of a treated sludge;
- at least two electrodes for treating the sludge by electro-osmosis, the electrodes including at least one cathode and at least one anode, and being disposed inside the cell, at least one of the electrodes is movable, and at least one of the electrodes is perforated so as to drain effluents generated during the process, each of the electrodes defining a surface adapted to constantly contact the sludge; and
- means for moving the at least one movable electrode, the means being connected to the at least one movable electrode, permits a constant contact between the surfaces and the sludge, and permits to apply a pressure on the sludge so that the sludge is submitted to the combined action of electro-osmosis and pressure, thereby dehydrating the sludge and generating at least one effluent drained by the perforations and the liquid portion outlet, at least one gas exited by the gaseous portion outlet, and at least one treated sludge exited by the solid portion outlet.

It has been found that the processes and apparatus of the invention permit to treat sludge in a simple an efficient manner. Moreover, these processes and apparatus permit to reduce important drops of potential at the electrodes and particularly at the anode. By reducing such important drops of potential, the treatment of the sludge is thus more efficient. Such processes and apparatus can be used to treat sludge without addition of any other additives. Another important advantage is that such processes and apparatus do not require any filter disposed between the sludge and the electrodes.

In the processes and apparatus of the invention, the pressure can be applied to the sludge by the at least one movable electrode varies according to the sludge consistency, the pressure increasing when the sludge consistency is increasing. The pressure applied to the sludge can be produced by a mechanic or a pneumatic means. As example, the pressure can be applied by a piston, a load or by friction. Preferably, the pressure applied to the sludge is substantially non-existent at the beginning of the treatment, and then, the pressure is progressively increased. A portion of sludge disposed adjacently to the at least one movable electrode can be submitted to a pressure comprised between 2 and 50 kPa. Such substantially low pressure values can also help to avoid the use of filters.

In the processes and apparatus of the invention, the movable electrode is preferably the anode. Preferably, the perforated electrode is the same than the immovable electrode. Advantageously, the anode is movable and the cathode is immovable, and the anode and the cathode comprise perforations. Preferably, the anode and the cathode each have a different cross section, one of the electrodes being disposed inside the other electrode, and preferably in a coaxial manner. Alternatively, the anode is movable and the cathode is immovable, so as to compensate a negative interstitial pressure generated by electro-osmosis at the anode. The anode and the cathode are preferably facing one another inside the cell. The treatment of the sludge can be carried out in a continuous manner or in a batch. The apparatus can be disposed in a vertical or horizontal manner.

In the processes and apparatus of the invention, at least one of the electrodes can have the same cross section than the cell. At least one of the electrode can comprise two portions: a first portion consisting of a perforated metal plate which is contacting the sludge, and a second rigid portion made of a non-conductive material, preferably a plastic, and comprising a reservoir disposed behind the metal plate. The electrodes can comprise, steel, titanium, platinum, the titanium is coated by iridium dioxide. The potential applied to the electrodes can range from 0.5 Volt/cm to 30 Volts/cm or 0.5 Volt/cm to 15 Volts/cm. Alternatively, the voltage can vary from 0.5 to 10 or 0.5 to 5 Volts/cm. The reservoir can comprise two different compartments, a first compartment for recovering effluents generated by the treatment, and a second compartment for recovering gases generated by the electrolysis. The basic effluent generated can have a pH comprised between 10 and 12, or of about 11. The acidic effluent generated can have a pH comprised between 4 and 6, or of about 5. The effluents generated or any precipitates thereof can be recovered and eventually treated.

In the processes and apparatus of the invention, reservoirs can be disposed adjacent to at least one of the electrodes so as to recover gases such as $H_2$, $O_2$, $NH_3$, and $CO_2$. These gases can be carried through the reservoirs through canals and/or holes defined within the upper portion of the electrodes. The lower part of the electrodes can comprise canals and/or holes for recovering effluents generated. The electrodes of the invention can define a surface which is totally in contact with the sludge i.e. the whole face or side of the electrode which is adjacent to the sludge is contacting the sludge. The cell can comprise at least one rectangular cross section, and preferably a substantially squared cross section. Alternatively, the cross section can be circular. The cell can comprise a reservoir for receiving and stocking the sludge to be treated. A pump can be present so as to carry the sludge from the reservoir to the cell. The bottom face of the cell can comprises apertures, preferably in the millimetre order, so as to evacuate effluents. The perforations of the electrodes can also be of the millimetre order. The movable electrodes is preferably moving in a straight manner within the cell. The cell is thus made consequently. The friction between the movable electrode and the internal portion of the cell can be substantially constant.

In the processes of an apparatus of the invention, the pressure preferably increases during the treatment of the sludge. Since both electrodes can drain effluents, the distance the water has to travel before exiting the apparatus is thus considerably reduced, thereby facilitating dehydration of the sludge. A very weak or non-existent pressure is preferably applied to the sludge at the beginning of the treatment. Increase of the pressure allows to develop inside the sludge a positive interstitial pressure which compensates the negative interstitial pressure, thereby facilitating filtration of the sludge. The voltage applied to the electrode is preferably maintained to a fixed value during the whole treatment even if the thickness of the sludge is reduced, thereby allowing the increase of voltage gradient.

When a process of the present invention is carried out in a batch manner, the cell preferably comprises two electrodes, a movable electrode and an immovable electrode. Both electrodes can be perforated and made of metal in order to drain effluents. These electrodes can be provided with reservoirs disposed behind metal plates connected to the electrodes and in fluid flow communication with ducts. In such an apparatus, the action of the pressure allows to maintain a constant contact between the electrodes and the sludge, so as to compensate the negative interstitial pressure generated by the electro-osmosis at the anode, and to favour dewatering of the sludge. Moreover, the action of the electric field enhances the movement of cations which carry the molecules of water towards the cathode by a viscous effect.

When a process of the present invention is carried out in a continuous manner, the apparatus can be disposed vertically. Such an apparatus preferably comprises two electrodes which are made of metal and perforated so as to drain effluents. The electrodes can also comprise reservoirs disposed behind the electrodes and in fluid flow communication with ducts. In such an apparatus, the action of the pressure allows to maintain a constant contact between the electrodes and the sludge, so as to compensate the negative interstitial pressure generated by the electro-osmosis at the anode, and to favour dewatering of the sludge.

In the process according to the first aspect of the invention, the voltage applied to the electrodes can be maintained substantially constant during the process, thereby permitting an increase of a voltage gradient. Alternatively, the voltage applied to the electrodes can be maintained substantially constant during successive plateaus wherein the voltage is adjusted to a fixed value so as to permit an increase of a voltage gradient.

In the process according to the second aspect of the invention, each of the electrodes can define a surface adapted to constantly contact the sludge. The pressure applied to the sludge can permit a constant contact between the surfaces and the sludge.

BRIEF DESCRIPTION OF THE DRAWINGS

Further features and advantages of the invention will become more readily apparent from the following description of preferred embodiments as illustrated by way of examples in the appended drawings wherein:

FIG. 4A is a front view of a reservoir of an electrode in an apparatus according to a preferred embodiment of the invention;

FIG. 4B is cross-section view of the reservoir shown in FIG. 4A, taken along the line 4B-4B;

FIG. 5 is view of the inferior part of an apparatus according to a preferred embodiment of the invention, wherein the inferior part is perforated;

Figure 1:
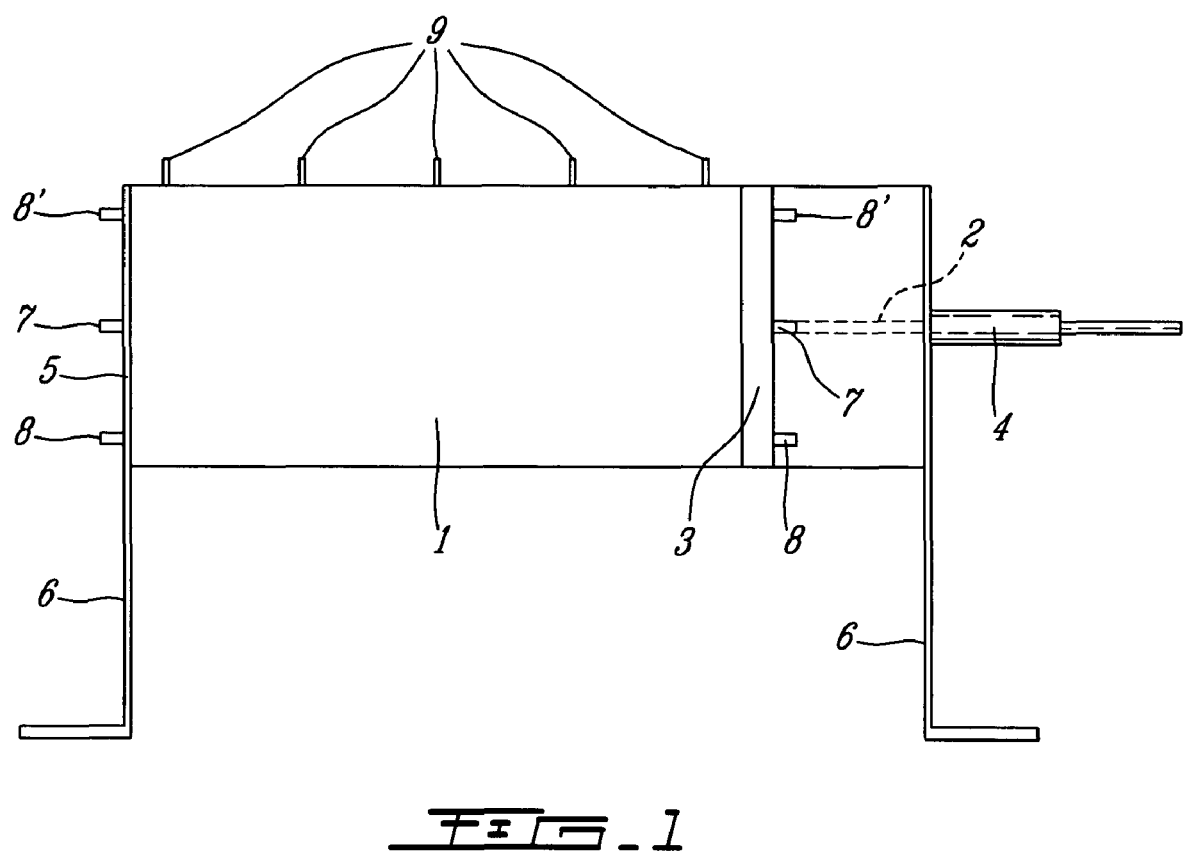
FIG. 1 is a schematic view of an apparatus for treating sludge according to a preferred embodiment of the invention.

The processes of the invention can be carried out by using an apparatus as illustrated in FIG. 1. First, the cell 1 is disposed horizontally as shown in FIG. 1. Then, the cover 2 constituted by the extendable and removable portion of the cell is removed. The electrode 3 is also removed from the cell 1 in order to insert the sludge. Once the cell 1 is filled with sludge, the cover 2 is reinstalled on the cell 1. The cell 1 is supported by support members 6. A power supply (not shown) is connected to the contact studs 7 by means of cables (not shown). At the beginning of the process, a potential is applied to the electrodes 3 and 5, and a pressure is applied on the sludge by means of the piston 4. During the process, the effluents are drained by means of the outlets 8 and the gases are evacuated by means of the outlets 8'. The studs 9 allow to measure the voltage at precise points of the cell. When the treatment is completed and the production of effluents is considerably diminished, the treatment is stopped.

Figure 2:
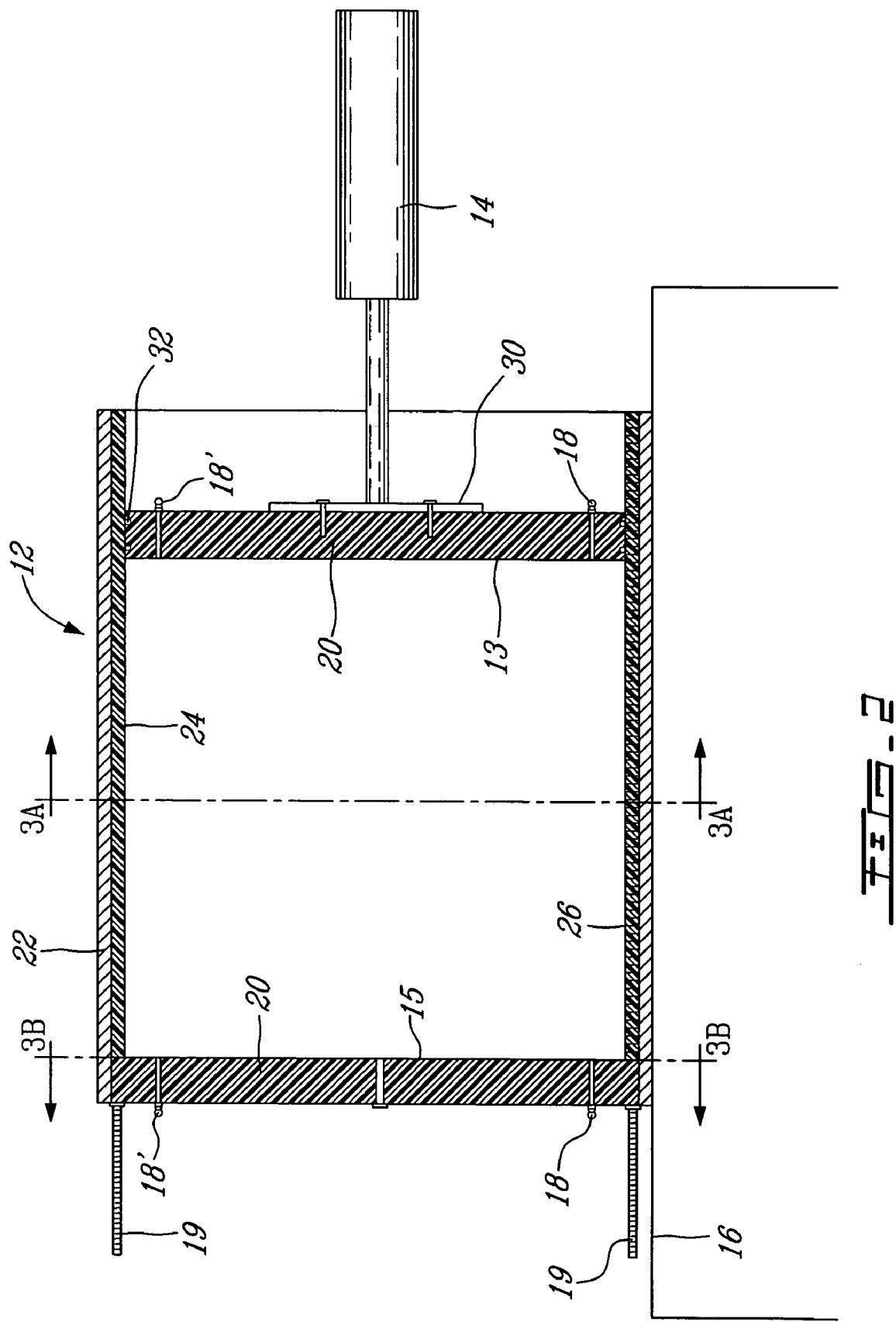
FIG. 2 is a cross-section view of an apparatus for treating sludge according to another preferred embodiment of the invention.
Figure 3B:
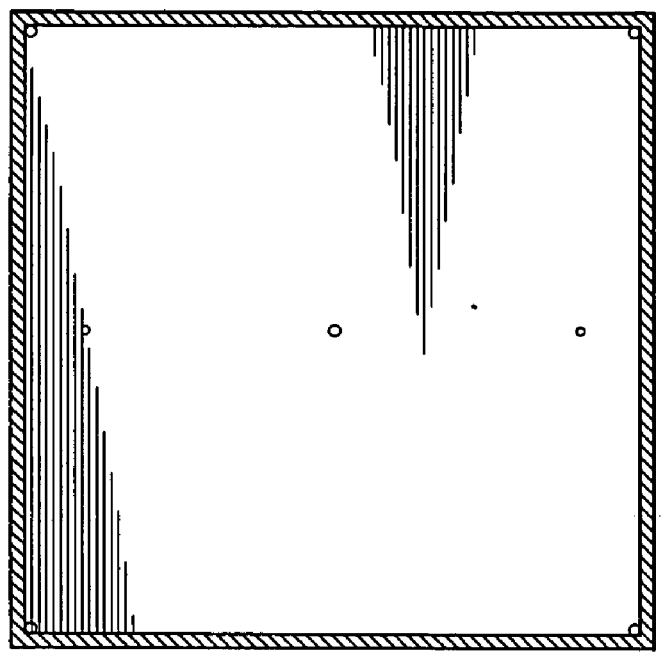
FIG. 3B is cross-section view of the apparatus shown in FIG. 2, taken along the line 3B-3B.
Figure 3A:
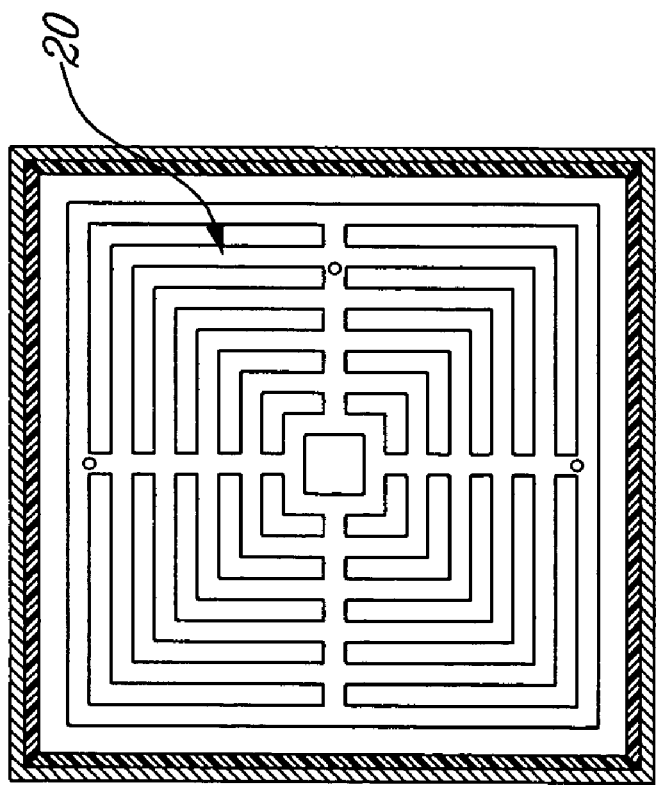
FIG. 3A is cross-section view of the apparatus shown in FIG. 2, taken along the line 3A-3A, wherein a metallic plate has been removed so as to show a reservoir.

Alternatively, the process can be carried out by using an apparatus as shown in FIG. 2. This apparatus comprises electrodes 13 and 15 having a reservoir 20 (FIGS. 3A and 4A) which comprises outlets 18 for evacuating effluents and outlets 18' for evacuating gases. Gases such as $H_2$, $O_2$, $NH_3$ and $CO_2$ can be generated during such a treatment. The reservoir 20 of the electrode 13 is connected to a piston 14 by means of a plate 30. The apparatus also comprises a support 16 for supporting the cell 12. The cell 12 also comprises a metal plate 22, a PVC plate 24, and a PVC perforated plate 26 for draining effluents. The cell 12 also comprises part or supports 19 attached to the electrode 15.

Figure 6:
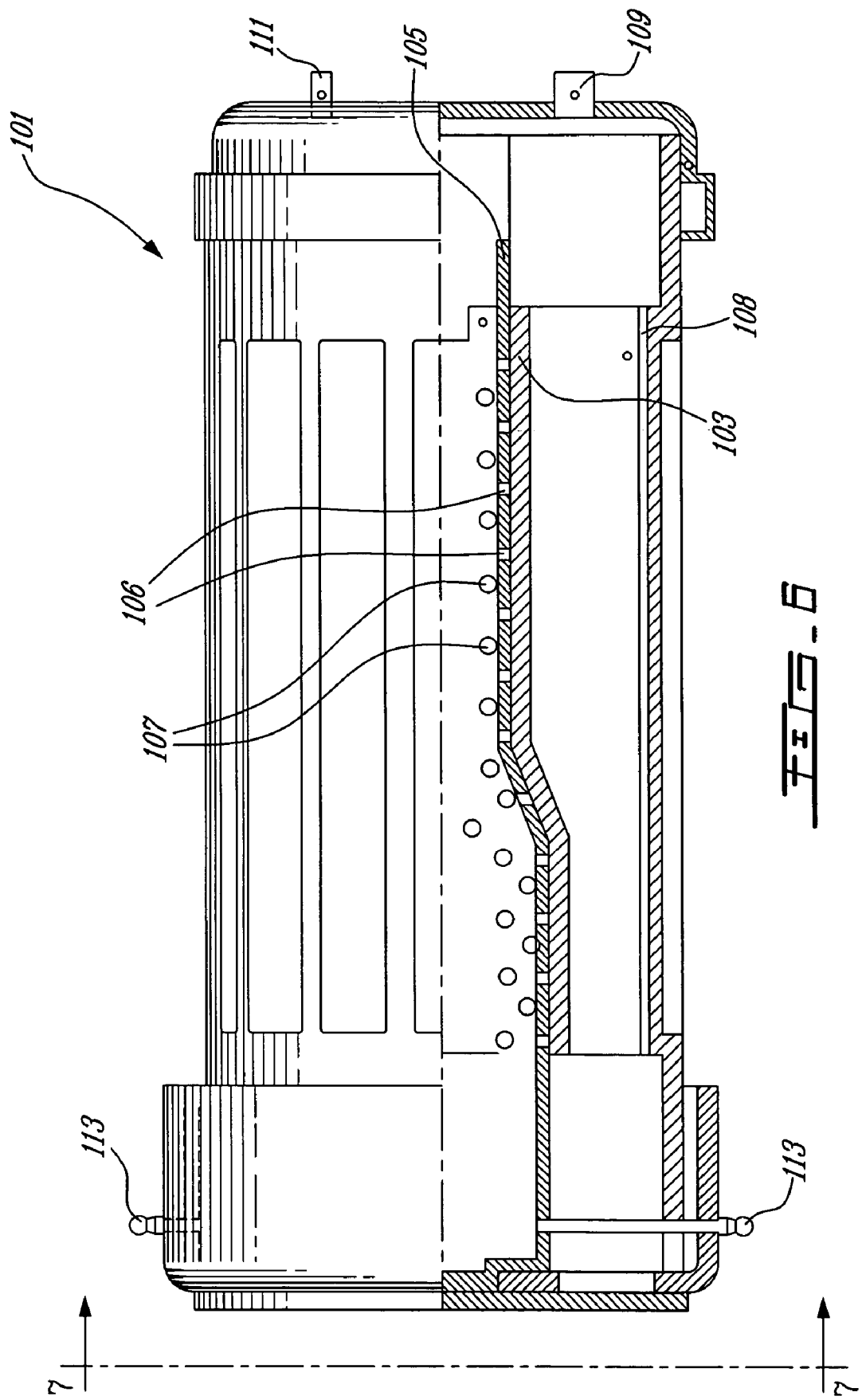
FIG. 6 is a partly fragmented view of an apparatus according to another preferred embodiment of the invention, wherein the left section represents an external portion of the apparatus, and the right section represents an internal section of the apparatus.
Figure 7:
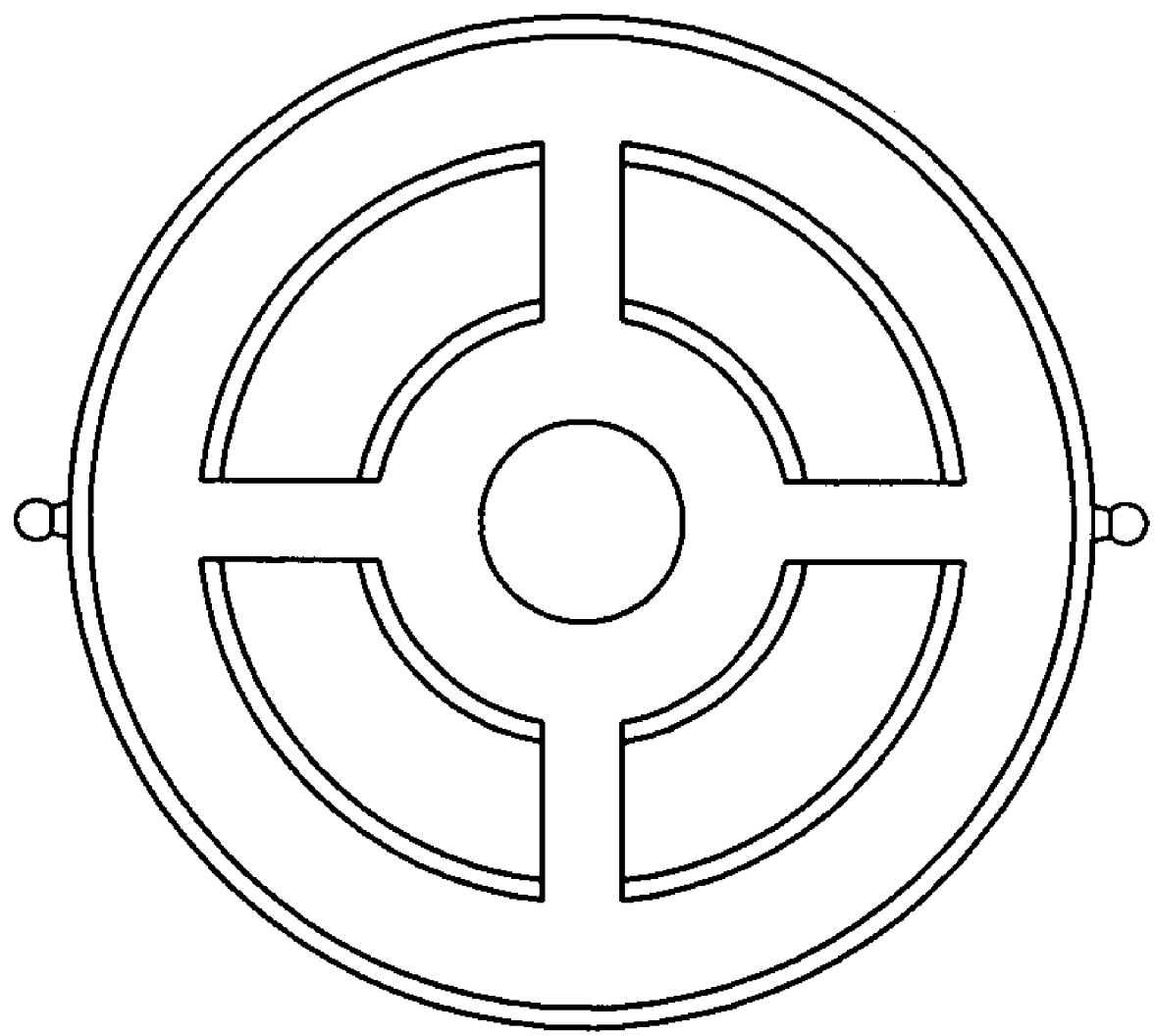
FIG. 7 is a front view of the apparatus of FIG. 6, taken along the line 7-7.

In a particular embodiment of the invention, the cell can have a variable cross section (see FIG. 6). In fact, the apparatus 101 comprises an anode 103 having a reservoir 105 including canals 106 for evacuating an effluent 107. This apparatus also comprises an cathode 108, an inlet 109 for the sludge to be treated, an outlet for gases 111, and an outlet for the effluents 113. The sludge outlet of apparatus 101 is shown in FIG. 7. The apparatus 101 is particularly used for treating sludge in a continuous manner.

The following non-limiting examples further illustrate the invention.

EXAMPLES

As it can be seen in the aforementioned figures, the apparatus of the invention comprises electrodes, a frame, a system for applying pressure to the sludge and a power supply (not shown). When using one of the apparatuses of the invention, the sludge is inserted between the two electrodes and then pressure is applied to the sludge. The electrodes are connected to the power supply by means of cables. In particular, the cables are attached to contact studs disposed on the electrodes. Optionally, the cell comprises an extendable portion for receiving the movable electrode. Such a portion is thus extended when a more important amount of sludge is introduced in the cell.

As example, the cell can be made of PVC material having a diameter of 20 cm and a height of 30 cm. Such a cell can be disposed horizontally on a support member. A sample of about 9 liters of sludge can be inserted between the two electrodes, the first electrode being immovable and fixed to the cell, and the second electrode is movable and connected to a piston. The electrode has two different sections, a first section consisting of a perforated metal plate which is contacting the sludge, and a second rigid section made of PVC and acting as a reservoir of a capacity of about 50 mL. Each reservoir comprises outlets for evacuating gases and for draining effluents. The cross-section of the electrode is about 314 $cm^2$. The pressure can be applied to the movable electrode by means of a piston.

Example 1

An agro-alimentary sludge obtained from the meat processing has been treated using a process and an apparatus according to the present invention. This sludge had an electrical resistivity of 238 $\Omega$cm. The sludge has been introduced in a chamber having a controlled humidity in order to reduce the drying process of the sludge since the room temperature could be between 20 and 25° C. The sludge has been introduced in the cell in 5 different layers of 3 cm each. These layers have been compacted by a plunger of about 200 g in order to diminish void spaces and to have certain uniformity between each layer. Then, the piston and the cover have been installed and the sludge has been submitted to an electrical current. The pressure applied to the sludge had an average of 13 kPa. At the beginning of the treatment, the pressure was about 2 to 3 kPa and it has been increased until the pressure of 50 kPa was obtained.

A voltage gradient of about 0.5 Volts/cm was applied at the beginning of the process so that a total voltage of about 8.5 Volts was applied to the electrode. This voltage has been maintained during the whole treatment. An initial electrical current of 130 mA has been measured at the contact stud.

After a few minutes, an effluent is evacuated from the anode and another one is evacuated from the cathode. The effluent recovered at the anode had a yellow color and a pH of about 4. The effluent recovered at the cathode had a brown color and a pH of about 12. The dryness of the sludge before treatment was 8.3% and 31.5% after the treatment.

Example 2

Another agro-alimentary sludge similar to the one described in Example 1 has been treated in the same manner than the previous one. This sludge had an electrical resistivity of 244 Ωcm. After 24 hours in a stock room having a temperature of 13° C. and a humidity of 90%, the sludge has been introduced in the cell as described in example 1, and having a volume of 1000 mL. The voltage of 8.5 Volts has been applied during 6 hours and the voltage gradient was of 0.5 Volt/cm. The volume of drained effluents was 466 mL. The dryness of the sludge before treatment was 10% and 25.3% after the treatment.

Example 3

Another agro-alimentary sludge as described in example 2 has also been treated. In this example, the sludge was stored for 1 week. This sludge had an electrical resistivity of 290 Ωcm. All the conditions of the treatment were the same as described in example 1. The volume of the sludge was 1 L. The volume of drained effluents was 280 mL. The dryness of the sludge before treatment was 9%, and 25% after the treatment.

Example 4

An agro-alimentary sludge obtained from a slaughterhouse has also been treated in the same manner as described in example 1. In this example, the sludge was stored for 3 days. This sludge had an electrical resistivity of 308 Ωcm. The cell had a rectangular cross section of 185 cm². The volume of the sludge was 925 mL. The sludge has been treated during 4 hours. The voltage of 2.5 Volts has been applied and the voltage gradient was of 0.5 Volt/cm. The volume of drained effluents was 194 mL. The dryness of the sludge before treatment was 14%, and 40% after the treatment.

Example 5

A municipal sludge has been treated in the same manner as described in example 1. This sludge has been treated during 26 minutes. The voltage gradient was of 13.33 Volts/cm. The weight of the sludge was 360.13 g. The volume of drained effluents was 183.67 mL. The dryness of the sludge before treatment was 12.27% and 42.05% after the treatment.

Example 6

A municipal sludge has been treated during 335 minutes in a cell as shown in FIGS. 6 and 7. This cell had a volume of 24 L. The volume of sludge was 80 L and the volume of drained effluents was 30.2 L. The voltage applied to the electrodes was 30 Volts and the voltage gradient was of 5 Volts/cm. The dryness of the sludge before treatment was 2.14%, and 17.60% after the treatment.

It also has been found that the processes and apparatuses of the invention can provide a bactericide effect to the treated sludge. In fact, a sludge had, before treatment, a fecal coliform concentration higher than 96000 MPN/g dry weight and, after treatment, a fecal coliform concentration lower than 6 MPN/g dry weight. Thus, an abatement rate of 99.99% of the fecal coliforms was obtained, thereby decontaminating the sludge from these pollutants.

It has thus been demonstrated that the processes and apparatus of the invention are quite useful for treating various type of sludge. It also has been shown these processes and apparatus are simple and easy to use. Moreover they do not necessitate use of additives, flocculants or filters and they permit to reduce the drop of potential at the anode. It has been found that by providing a constant contact between the whole surface of the electrodes (the surface which is adjacent to the sludge) and the sludge, and by varying the pressure according to the sludge consistency i.e. increasing the pressure when the sludge consistency is increasing, optimal results can be obtained. Moreover, it also has been found that when the voltage applied to the electrodes is maintained substantially constant during the process or during successive plateaus wherein the voltage is adjusted to a fixed value, very interesting results are also obtained.

The processes and apparatuses of the invention can be useful for treating organic and/or inorganic sludge such as colloidal sludge, sludge from pulp and paper industries, sludge issued from a chemical or biological treatment, sludge from a dairy, sludge from a slaughterhouse, sludge form liquid or semi-liquid manure such as pork manure, and sludge from wastewater treatment plant.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. A process for treating sludge by the combined action of electro-osmosis and pressure, said process comprising varying a pressure applied to said sludge as an electric current passing through said sludge causes consistency of said sludge to increase.

2. The process of claim 1, wherein the pressure applied to said sludge is increased during said process.

3. The process of claim 2, wherein the pressure applied to said sludge is substantially non-existent at the beginning of the treatment, and then, the pressure is increased.

4. The process of claim 1, wherein the pressure applied to said sludge is progressively increased during said treatment.

5. The process of claim 2, wherein said pressure applied to said sludge allows to develop a positive interstitial pressure in the sludge which compensates for the decrease in interstitial pressure resulting from drained effluent.

6. The process of claim 2, wherein the pressure applied is increased according to sludge consistency.

7. The process of claim 1, wherein said process provides a bactericide effect on the treated sludge.

8. The process of claim 1, wherein the treatment comprises dehydrating said sludge.

9. The process of claim 1, wherein a voltage applied across electrodes for generating said electric current is maintained substantially constant during said process.

10. The process of claim 1, wherein a voltage applied across electrodes for generating said electric current is maintained substantially constant during successive plateaus wherein said voltage is adjusted to a fixed value.

11. The process of claim 1, wherein the pressure applied to said sludge is substantially non-existent at the beginning of the treatment, and then, the pressure is progressively increased.

12. The process of claim 1, wherein a portion of said sludge is submitted to a pressure comprised between 2 and 50 kPa.

13. The process of claim 1, wherein the pressure applied to said sludge permits a constant contact between said electrode surfaces and said sludge.

* * * * *